Patented June 15, 1926.

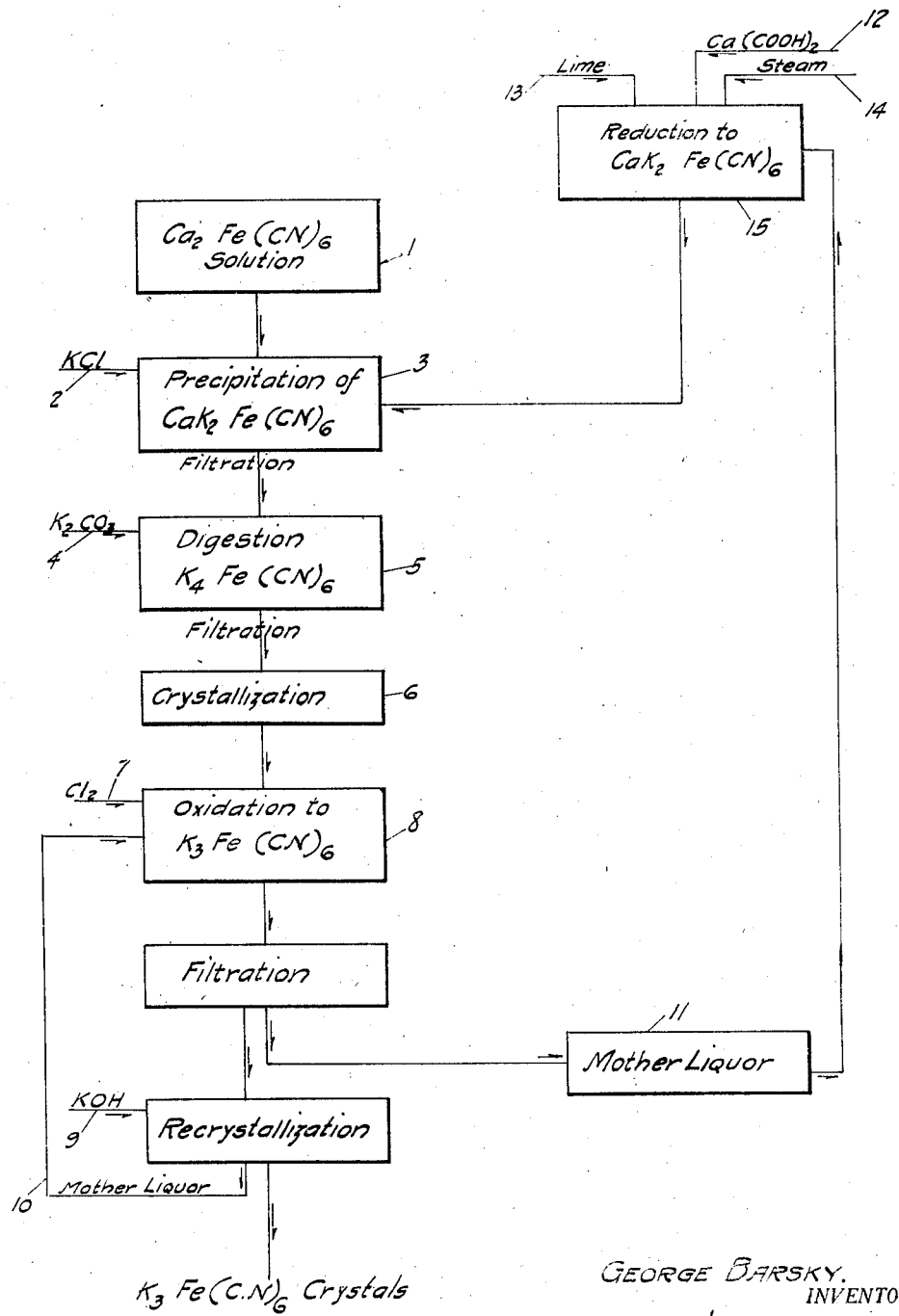

1,589,041

UNITED STATES PATENT OFFICE.

GEORGE BARSKY, OF NEW YORK, N. Y., ASSIGNOR TO AMERICAN CYANAMID COMPANY, OF NEW YORK, N. Y., A CORPORATION OF MAINE.

METHOD OF MAKING POTASSIUM FERRICYANIDE.

Application filed October 2, 1925. Serial No. 60,046.

This invention relates to the production of potassium ferricyanide by the oxidation of ferrocyanide by chemical reagents.

It has been customary to make potassium ferricyanide by providing a solution of potassium ferrocyanide and passing chlorine therethrough, keeping the solution cold throughout the operation until conversion was complete. An excess of chlorine should not be used, nor should the solution be allowed to become warm as such conditions tend to the formation of complex, insoluble, green compounds which are difficult to remove. The solution was then evaporated and the ferricyanide allowed to crystallize on cooling; the mother liquor was again evaporated and the salt crystallized therefrom, but it was contaminated with potassium chloride. This method was fairly successful but great care was necessary to prevent the solution from heating up and forming the undesirable green compounds, and the introduction of chlorine into the solution had to be carefully regulated to convert all of the ferrocyanide without adding an excess thereof. The cost of evaporation of the resulting solution was considerable.

The present invention is adapted to overcome these difficulties, it being among the objects of this invention to provide a method of making potassium ferricyanide in which it shall not be necessary to maintain the solution very cold during the reaction period, which shall avoid the necessity of evaporating the solution, and in which the control of the various factors entering into the reaction need not be very close.

It is also among the objects of my invention to provide a substantially continuous process and one in which the various mother liquors are completely utilized in the reaction.

In practicing my invention I provide a solution of potassium ferrocyanide into which chlorine is passed as heretofore, but I utilize a saturated solution containing an excess of solid potassium ferrocyanide and, as a result, as the reaction proceeds the potassium ferricyanide produced crystallizes out of the solution while the excess of potassium ferrocyanide is dissolved, giving substantially pure potassium ferricyanide crystals which may be further purified by recrystallization. I do not carry the reaction to absolute completion but stop the introduction of chlorine at a convenient point and thus avoid the formation of the undesirable green compounds incident to over-chlorination. I have discovered that, contrary to the prior methods, it is not essential to keep the solution cool, but that decomposition during the reaction may be prevented by the addition of a small amount of a protective alkaline material, such as potassium hydroxide, to the reacting mixture. The mother liquor from the crystallized product, containing a number of constituents, is treated to reduce the ferricyanide content to ferrocyanide, and it then reenters the process, and I have found that this reduction may be accomplished in a very satisfactory manner by the use of calcium formate.

The accompanying drawing is a flow sheet showing the adaptation of my improvements to the production of potassium ferricyanide from calcium ferrocyanide.

I first prepare a solution 1 of calcium ferrocyanide to which is added a sufficient amount of potassium chloride 2 to form calcium potassium ferrocyanide 3, which precipitates out and is removed by filtration. It is then digested with potassium carbonate 4 to produce potassium ferrocyanide solution 5 and calcium carbonate which is removed by filtration, and the solution is evaporated in 6 to crystallize at least part of the ferrocyanide 1 into the resulting slurry, which contains a small quantity of potassium hydroxide, say 4% of the ferrocyanide present to prevent decomposition, chlorine 7 is passed causing oxidation of the ferrocyanide and conversion to potassium ferricyanide 8, but the introduction of chlorine is stopped before all the ferrocyanide is converted. Crystals of ferricyanide are formed during the reaction and the crystals of ferrocyanide go into solution. The mixture is subjected to filtration, and the crystals are purified, if desired, by recrystallization in the presence of a small amount of potassium hydroxide 9. The mother liquor 10 resulting from the recrystallization of the ferricyanide is returned to the potassium ferrocyanide solution which is then subjected to the action of the chlorine, and its contained potassium hydroxide furnishes the alkalinity necessary to prevent decomposition during the chlorination.

The mother liquor 11 from the filtration of the potassium ferricyanide crystals contains potassium ferricyanide and potassium chloride, is treated with calcium formate 12 and lime 13 in the presence of steam 14, resulting in the production of calcium potassium ferrocyanide 15 together with other soluble and insoluble compounds, the whole being added to the vessel in which calcium potassium ferrocyanide is being precipitated. The cycle of operations is then repeated.

In the practice of my invention I need not start with calcium ferrocyanide. For instance, I dissolved 9.3 kilograms of ground potassium ferrocyanide in 10 liters of water and added 200 grams of potassium hydroxide, the amount of potassium ferrocyanide present being in excess of its solubility. The mixture was agitated and chlorine was passed in until the solution began to darken. Crystals of potassium ferricyanide were formed and were filtered off and dried in a vacuum oven. The filtrate was boiled with 280 grams of calcium formate, (60% pure), and 200 grams of lime, for two hours with constant stirring. The mass was filtered and then digested with potassium carbonate, giving a solution of potassium ferrocyanide which may be utilized for the production of potassium ferricyanide as above described, or for other purposes.

It will be noted that my process produces crystalline potassium ferricyanide directly without the necessity of evaporating solutions thereof with the consequent decomposition of ferricyanide which can only be avoided by evaporation in a vacuum, a relatively expensive procedure. There is no substantial loss of cyanide in the process since the mother liquors produced are re-circulated in the system and I have obtained a total recovery of materials of 98%, although the recovery of ferricyanide at each operation is only 70% to 75% of the total cyanide present. The proportions of ingredients used may be varied within wide limits with good results and no close control of the details of the process is necessary as the addition of a small amount (2%–10%) of potassium hydroxide to the reaction mixture prevents decomposition without the necessity of artificial cooling of the solution other than by use of ordinary cooling water. The product is relatively pure, even the first crude crystals containing less than 3% of potassium chloride and about 0.8% of potassium ferrocyanide; a simple recrystallization of the product reduces the said impurities to 0.3% and 0.2%, respectively. Various changes may be made in the details of the process as will be understood by those skilled in the art, the scope of my invention being defined in the claims appended hereto.

What I claim is:

1. The method of making potassium ferricyanide which comprises providing a solution of potassium ferrocyanide, adding a small amount of alkali thereto, and oxidizing the solution to ferricyanide.

2. The method of making potassium ferricyanide which comprises providing a solution of potassium ferrocyanide, adding a small amount of alkali thereto, and oxidizing the solution to ferricyanide by passing chlorine thereinto.

3. The method of making potassium ferricyanide which comprises providing a solution of potassium ferrocyanide, adding a small amount of alkali thereto, oxidizing the solution to ferricyanide by passing chlorine thereinto, filtering off the crystals formed and recovering the ferro- and ferricyanides from the filtrate.

4. The method of making potassium ferricyanide which comprises providing a solution of potassium ferrocyanide, adding a small amount of alkali thereto, oxidizing the solution to ferricyanide by passing chlorine thereinto, filtering off the crystals formed and treating the filtrate to reduce the ferricyanide therein to ferrocyanide.

5. The method of making potassium ferricyanide which comprises providing a solution of potassium ferrocyanide, adding a small amount of alkali thereto, oxidizing the solution to ferricyanide by passing chlorine thereinto, filtering off the crystals formed and treating the filtrate to reduce the ferricyanide therein to ferrocyanide by adding an organic reducing agent thereto.

6. The method of making potassium ferricyanide which comprises providing a solution of potassium ferrocyanide, adding a small amount of alkali thereto, oxidizing the solution to ferricyanide by passing chlorine thereinto, filtering off the crystals formed and treating the filtrate to reduce the ferricyanide therein to ferrocyanide by adding calcium formate thereto.

7. The method of making potassium ferricyanide which comprises providing a solution of potassium ferrocyanide, adding a small amount of alkali thereto, oxidizing the solution to ferricyanide by passing chlorine thereinto, filtering off the crystals formed and treating the filtrate to reduce the ferricyanide therein to ferrocyanide by adding calcium formate and lime thereto.

8. The method of making potassium ferricyanide which comprises providing a solution of potassium ferrocyanide, adding a small amount of alkali thereto, oxidizing the solution to ferricyanide by passing chlorine thereinto, filtering off the crystals formed, treating the filtrate to reduce the ferricyanide therein to ferrocyanide, and converting the same to potassium ferrocyanide.

9. The method of making potassium ferricyanide which comprises providing a solution of potassium ferrocyanide containing an excess of solid potassium ferrocyanide, adding a small amount of alkali thereto and oxidizing the solution to ferricyanide by passing chlorine thereinto.

In testimony whereof, I have hereunto subscribed my name this 30th day of Sept., 1925.

GEORGE BARSKY.